E. G. JOHANSON.
ROTARY INTERNAL COMBUSTION ENGINE.
APPLICATION FILED MAY 15, 1916.

1,261,938.

Patented Apr. 9, 1918.
4 SHEETS—SHEET 1.

Emil G. Johanson
INVENTOR.

BY *Milo H. Stevens & Co.*
ATTORNEYS.

Emil G. Johanson
INVENTOR.

E. G. JOHANSON.
ROTARY INTERNAL COMBUSTION ENGINE.
APPLICATION FILED MAY 15, 1916.

1,261,938.

Patented Apr. 9, 1918.
4 SHEETS—SHEET 3.

Emil G. Johanson
INVENTOR.

BY [signature]

ATTORNEYS.

Emil G. Johanson
INVENTOR.

ATTORNEYS.

UNITED STATES PATENT OFFICE.

EMIL G. JOHANSON, OF CHICAGO, ILLINOIS, ASSIGNOR TO THE NORLING ROTARY ENGINE COMPANY, OF PIERRE, SOUTH DAKOTA, A CORPORATION OF SOUTH DAKOTA.

ROTARY INTERNAL-COMBUSTION ENGINE.

1,261,938.                 Specification of Letters Patent.        Patented Apr. 9, 1918.

Application filed May 15, 1916. Serial No. 97,576.

*To all whom it may concern:*

Be it known that I, EMIL G. JOHANSON, a subject of the King of Sweden, residing at Chicago, in the county of Cook and State of Illinois, have invented new and useful Improvements in Rotary Internal-Combustion Engines, of which the following is a specification.

This invention relates to internal-combustion engines in which the piston has a rotary movement, and the object of the invention is to provide a novel and improved piston arrangement and structure whereby a powerful and highly efficient engine is produced, and one in which several rotative impulses are imparted during each revolution of the piston.

The invention also has for its object to provide a rotary engine of the kind stated which is provided with compression and explosion chambers, in the former of which the fuel charge is compressed, and from which the compressed charge is transferred to the explosion chambers and fired therein, novel and improved means being provided for controlling the fuel admission and the transfer from the compression to the explosion chambers.

A further object of the invention is to provide a novel and improved means for cooling the engine, an air cooling system being employed.

Other objects and advantages of the invention will be pointed out in the detailed description appearing hereinafter, and in order that the same may be better understood, reference is had to the accompanying drawings forming a part of this specification.

In the drawings—

Figure 1:
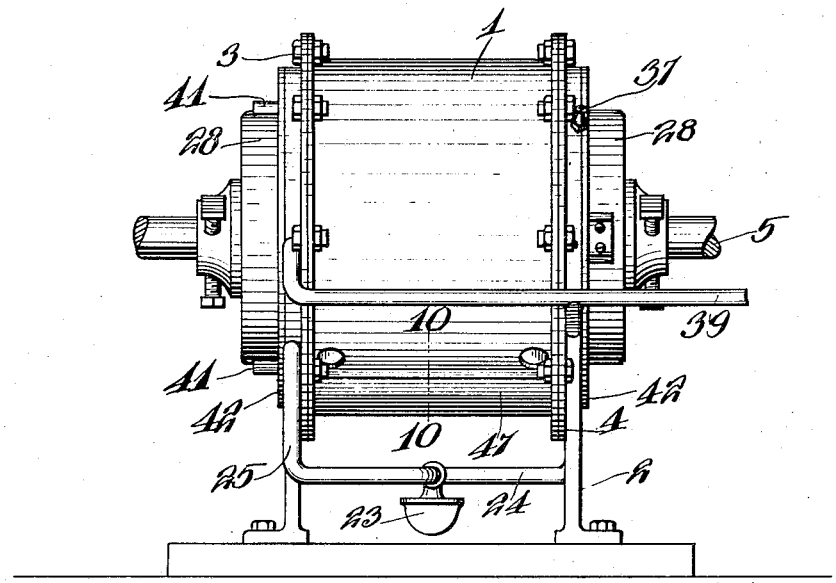
Figure 1 is a side elevation of the engine.
Figure 3:
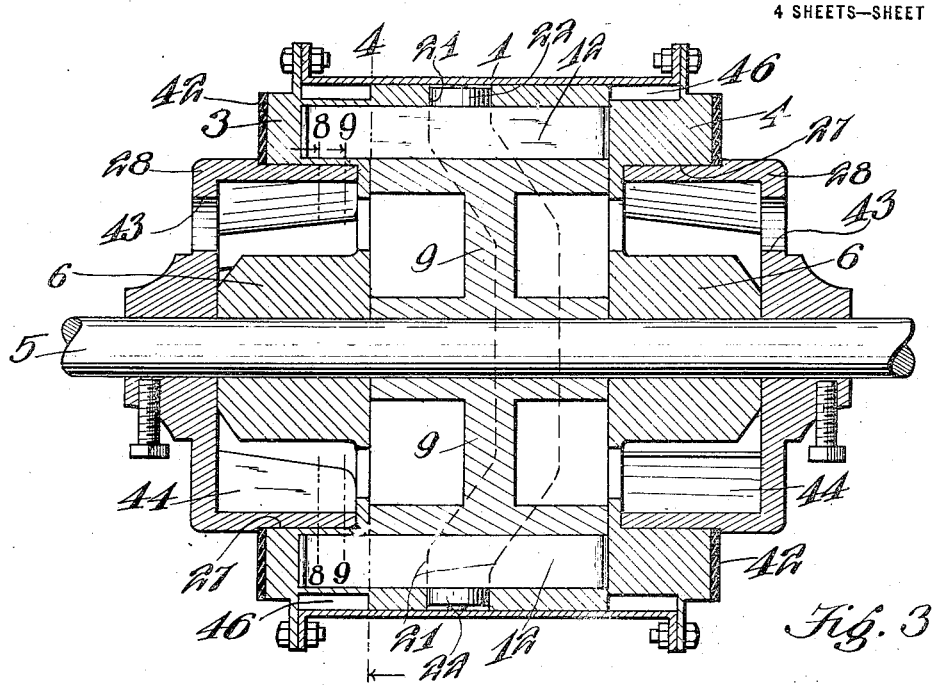
Fig. 3 is a central longitudinal section of the engine.
Figure 4:
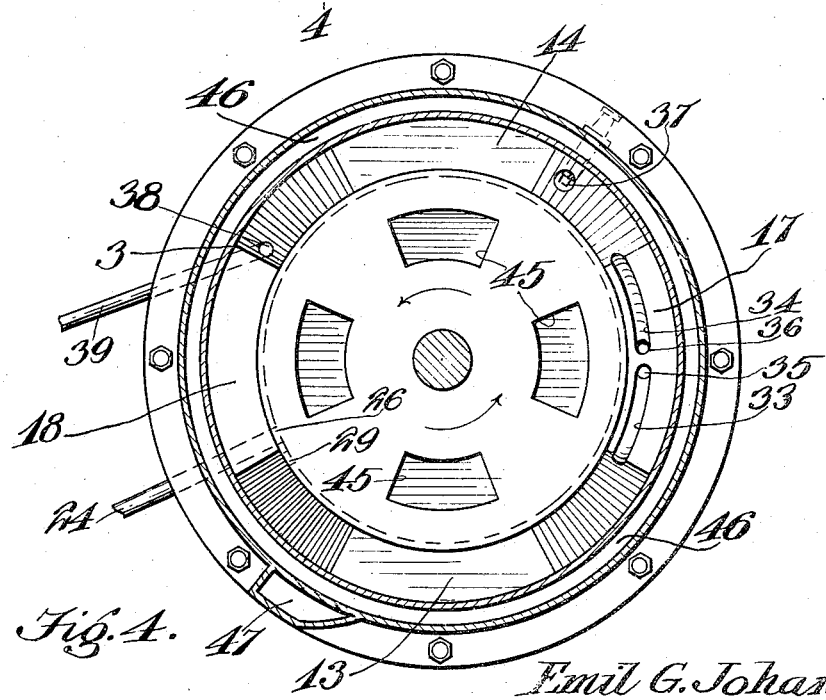
Fig. 4 is a vertical section on the line 4—4 of Fig. 3.
Figures 5, 6:
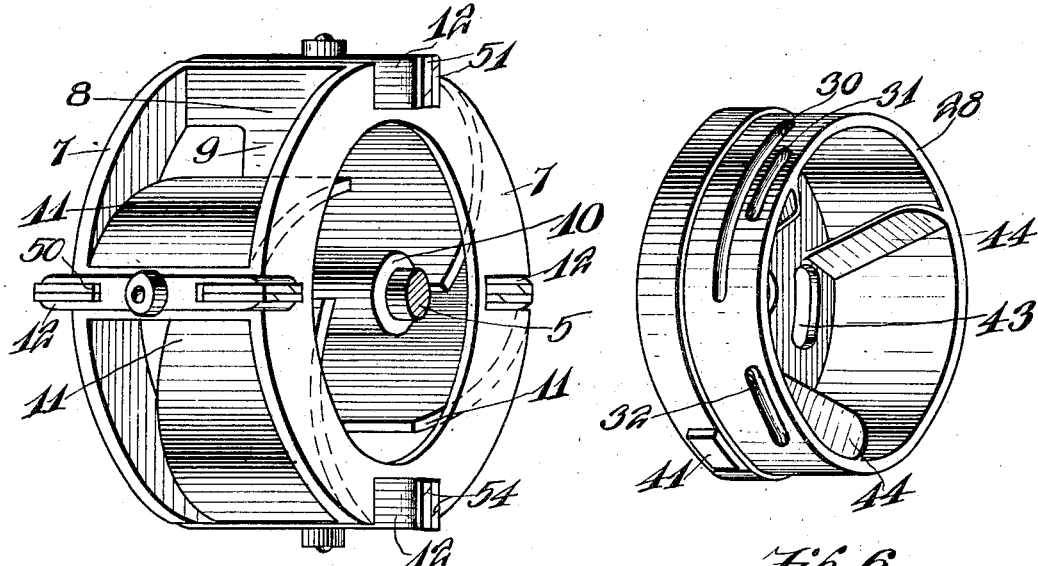
Fig. 5 is a perspective view of the rotor.
Fig. 6 is a perspective view of one of the valves.
Figure 7:
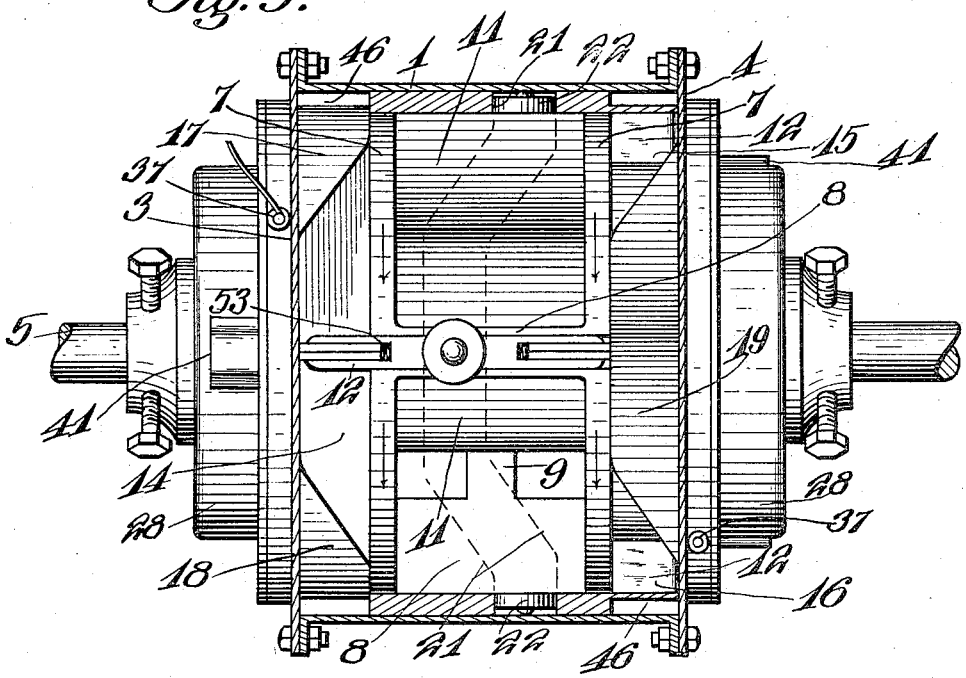
Fig. 7 is a plan view of the invention with the cylinder partly broken away.
Figures 8, 9:
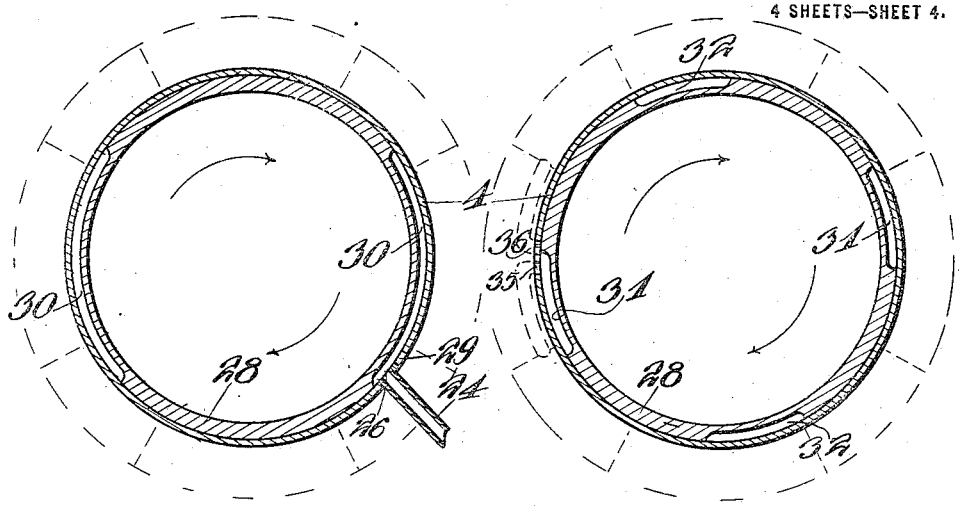
Figure 10:
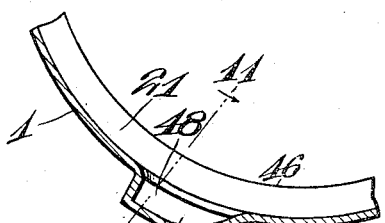
Figure 11:
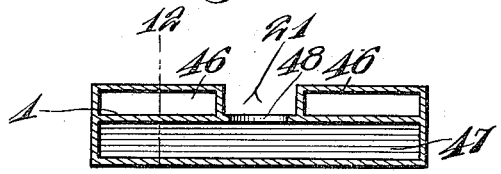
Figure 12:
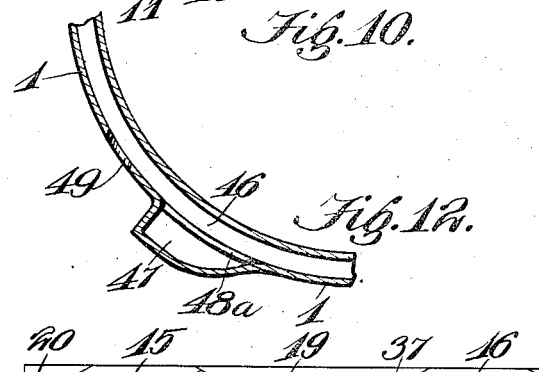
Figure 13:
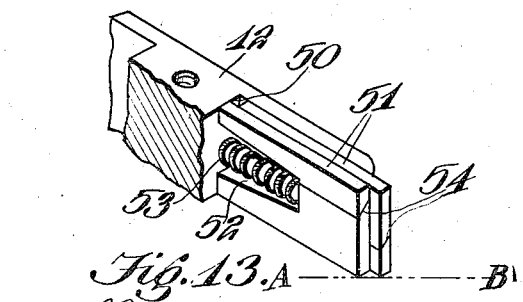

Figs. 8 and 9 are sectional details on the lines 8—8 and 9—9, respectively, of Fig. 3;

Fig. 10 is a sectional detail on the line 10—10 of Fig. 1;

Fig. 11 is a section on the line 11—11 of Fig. 10;

Fig. 12 is a section on the line 12—12 of Fig. 11;

Fig. 13 is a detail in perspective showing one of the piston wings, and

Figure 14:
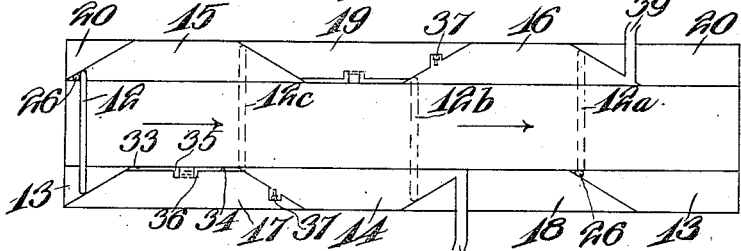

Fig. 14 represents a development of the explosion and compression chambers of the engine, and showing graphically the position of the piston wings.

Referring specifically to the drawings, 1 denotes the cylinder of the engine, the same being supported by a suitable stand 2 and closed at its ends by heads 3 and 4, respectively. Passing centrally through the cylinder is a shaft 5 which also extends through the cylinder heads, the latter having shaft bearings 6. The shaft 5 will be provided with a pulley or other suitable means (not shown) for transmitting its motion. In the cylinder works a rotor which is fixed on the shaft to impart motion thereto.

The rotor comprises two laterally spaced rings 7 connected by transverse webs 8, which latter in turn are connected by spokes 9 to a hub 10 through which the shaft passes, and on which the hub is fixed in any suitable manner. The spokes 9 do not extend throughout the entire width of the webs 8, so that the rotor has a skeleton form. From each web 8 also extends a wing 11 having the function of an air deflector blade as will be described more particularly hereinafter. These wings are located between the end rings 7 and project inward from the outer ends of the webs 8 to the spokes 9. Associated with the rotor is a series of piston wings 12 which are slidably mounted in transverse grooves in the periphery of the webbed portions of the rotor and the end rings. The piston wings therefore move parallel to the axis of the shaft 5.

The diameter of the rotor corresponds to the inside diameter of the cylinder 1 so that its periphery is in rotary contact with the latter. The width of the rotor corresponds to the distance between the cylinder heads 3 and 4, the ends of the rotor being thus in rotary contact with the latter.

The length of the piston wings 12 is greater than the width of the rotor so that they may be projected from the ends of the latter. At regular intervals the cylinder heads 3 and 4 have chambers into and out of which the projecting ends of the piston wings are slidable. The chambers of the cylinder head 3 are indicated at 13 and 14, and those of the cylinder head 4, at 15 and 16. The chambers 13 and 14 are diametrically opposite, and the chambers 15 and 16 are also diametrically opposite. The angular distance between the two sets of chambers is 90 degrees, so that the chambers are located on opposite sides of the rotor in alternate order. The length of the piston wings is such that they can extend entirely across the chambers, and their height is such that they extend between the top and bottom of the chambers. The piston wings travel through the chambers from one end to the other when the rotor is in motion. The walls of the cylinder heads between the chambers serve as abutments, with which the ends of the rotor and the piston wings are in sliding contact. The abutments of the cylinder head 3 are shown at 17 and 18, and those of the cylinder head 4 at 19 and 20. It will be noted in Fig. 14 that the abutments of one cylinder head are opposite the chambers of the other cylinder head. It will therefore be evident that when the rotor is turning, the piston wings slide back and forth longitudinally, or parallel to the axis of the shaft, and they extend at one end into the chambers upon reaching the same, and as the rotor continues to turn, these ends of the wings are retracted and the opposite ends enter the next chamber on the opposite side of the rotor. To render more positive the sliding movement of the piston wings, the cylinder 1 is provided on the inside with a sinuous cam groove 21 into which extend rollers 22 carried by the piston wings. The ends of the chambers are made slanting, said ends on the respective sides of the rotor being parallel, so that the piston wings may slide smoothly into and out of the same.

One of the chambers on each side of the rotor is an explosion chamber, and the other chambers are compression chambers. In the present instance, the chambers 14 and 16 are the explosion chambers, and the chambers 13 and 15 are the compression chambers. Thus, it will be seen that the two explosion chambers are on opposite sides of the rotor in successive order, this arrangement being also true with respect to the compression chambers.

At 23 is shown a carbureter or other suitable charge-forming device from which delivery pipes 24 and 25 extend to the respective cylinder heads. The cylinder head 4 has an inlet 26 to which the pipe 24 is connected. This portion of the cylinder head has a concentric circular cavity 27 in its outer face, in which a rotary valve 28 works. The inlet port extends radially through the cylinder head and opens into the cavity in which the valve works. Adjacent to the inlet port is a port 29, this port being so located in the wall of the cylinder head that it opens into the compression chamber 15.

The valve 28 has two diametrically opposite peripheral channels or grooves 30 so located that they lap the ports 26 and 29 twice every revolution, to admit a fuel charge from the pipe 24, through the port 29, into the chamber 15, the channels 30 establishing communication between the ports 26 and 29.

The periphery of the valve 28 also has two diametrically opposite short channels 31 which are for the purpose of transferring the compressed fuel charge from the compression chamber 15 to the explosion chamber 16. Two other diametrically opposite channels 32, for a purpose to be presently described, are also provided.

In the face of the abutment 17, between the chambers 13 and 14, are two channels 33 and 34, respectively, the channel 33 opening into the chamber 13, and the channel 34 opening into the chamber 14. From the inner ends of the channels, ducts 35 and 36, respectively, lead through the abutment to that portion of the cavity 27 in which the valve 28 works, the ducts being so located relative to the channels 31, that the latter may lap the same.

The port 29 opens into one end of the chamber 13, and the channel 33 leads from the opposite end thereof. In that end of the explosion chamber 14 into which the channel 34 opens is located an igniter 37, and at the opposite end is an exhaust port 38, the same being in the abutment 18. A pipe 39 connected to the exhaust port conducts the spent gases to a muffler, or discharges the same directly into the atmosphere.

The arrangement of fuel ports, valve, etc., on the other end of the cylinder is the same as that just described.

Two diametrically opposite ones of the piston wings 12 are the working pistons and receive the impulse of the explosions in the chambers 14 and 16, and the other wings serve as pump pistons to compress the fuel charges, and also to scavenge the explosion chambers. The engine gets two impulses in short succession every half revolution, these impulses occurring alternately on opposite sides of the rotor. The operation of the engine may be summarized as follows:

In order that the operation may be better understood, reference is had to Fig. 14 in which the several piston wings are indicated by the reference characters 12, 12$^a$, 12$^b$ and 12$^c$, respectively. The direction of rotation is shown in this diagram by arrows. When one of the channels 30 laps the ports 26 and 29, as shown in Fig. 8, the piston wing 12 is entering the chamber 15 and upon passing the port 29 a fuel charge is drawn into the chamber through said port. Before entering the chamber 15, the piston wing 12 had swept through the chamber 13 making a suction stroke and drawing in a charge. While the piston wing 12 is making a suction stroke in the chamber 15, the wing 12ª behind the same is passing through the chamber 13 and compresses the previously admitted charge therein. As the wing 12 is about to enter the explosion chamber 14, the wing 12ª crowds the compressed charge in chamber 13 into the chamber 14 behind the piston 12, and the charge is then fired. The transfer of the charge from chamber 13 to chamber 14 is through the channel 33, duct 35, duct 36 and channel 34, by one of the channels 31 lapping said ducts as shown in Fig. 9. During the firing stroke of the wing 12 in the chamber 14, the wing 12ª is compressing the previously admitted charge in the chamber 15 and the transfer from said chamber to the explosion chamber 16 takes place, so that when the wing 12 enters the latter it receives another impulse. The wing 12ª following the wing 12 passes through the chambers 14 and 16 in the same order and sweeps out the spent gases through the exhaust ports 38. This action is now repeated by the wings 12ᵇ and 12ᶜ, the wing 12ᵇ receiving the impulse of the explosions. The function of the channels 32 is to relieve useless compression of air and resulting loss of power in the chambers and to admit cool air from the chamber 15 to the chamber 16, and from the chamber 13 to the chamber 14, these channels lapping the ducts 35 and 36 at the proper time in the same manner as the channels 31, and the admission of air taking place during the exhaust strokes.

Figure 2:
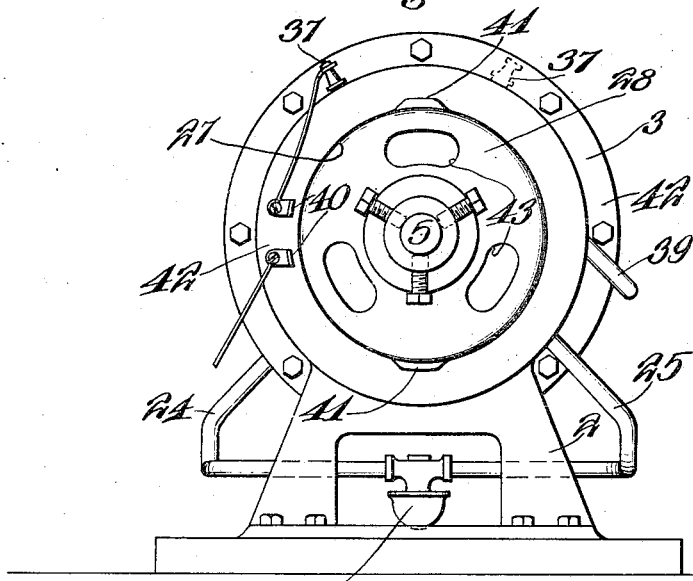
Fig. 2 is an end view thereof.

The valves 28 are utilized for timing the explosions. As shown more particularly in Fig. 2, the cylinder head 3 carries two contacts 40 suitably wired to one of the igniters 37 and situated in the path of two diametrically opposite cams 41 on the periphery of the valve. Twice every revolution of the valve, the cams bridge the contacts and close the ignition circuit. The timer mechanism at the other end of the engine is the same as the one just described. The contacts 40 are insulated from the cylinder head by a plate 42 of insulation.
The engine is air-cooled. It will be noted that the valves 28 are hollow, they being open at their inner ends and their outer end walls having openings 43. On the inside of the valves are fan blades 44 extending inward from the inner periphery thereof. In that portion of the cylinder heads 3 and 4 against which the inner ends of the valves seat are openings 45, these openings being inside the circles described by the inner periphery of the end rings 7 of the rotor. As the rotor is of skeleton construction, it will be evident that when the engine is running air will be drawn into the center thereof from both ends through the openings 43 and 45.
The inward pressure of air, centrifugal force and the wings 11 of the rotor force the air radially outward. The cylinder 1 is jacketed, each end having a jacket 46 extending circumferentially around the same and located in the plane of the explosion and compression chambers, and the abutments therebetween. The two jackets are connected by a transverse duct or channel 47 having a port 48 which opens into the cam groove 21, the annular channels or jackets 46 being located on opposite sides of the latter. The channels 46 and 47 are in communication through ports 48ª. Adjacent to the channel 47, the walls of the channels 46 have outlet ports 49 opening to the atmosphere. The air inside the rotor passes along the cam groove 21 and enters the channel 47 through the port 48, and from said channel the air passes into the channels 46 and escapes therefrom through the ports 49. It will therefore be seen that there is a constant circulation of air around the cylinder 1, and the engine is thus kept properly cooled.

Each piston wing 12, as shown more particularly in Fig. 13, has a slot 50 cut in each end in which are slidably seated two blades 51 of equal dimensions. These blades have a common slot 52 in their inner ends to accommodate a spring 53 which tends to push the blades outward against the cylinder heads 3 and 4, said blades therefore serving as a piston packing. A fluid tight joint at the inner surface of the cylinder 1 is had by the centrifugal force tending to throw the piston wings outward radially. To obtain a tight joint with the floor of the chambers 13, 14, 15 and 16, the blades 51 are split obliquely as shown at 54, and the slots 52 are made tapered so that the spring will tend to spread the blades. Fig. 13 also shows the manner in which the blades 51 adapt themselves to the oblique faces of the cylinder abutments. With the line A—B representing the outline of one of such faces, it will be noted that one of the blades 51 is forced by the spring 53 to extend slightly beyond the end of the other, both blades being thus kept in contact with the slanting portion of the abutment. This feature operates to prevent loss of compression, or leakage as the piston wings move across the oblique faces of the cylinder abutments.

The preferred embodiment of the invention has been shown and described, but it is to be understood that various changes in the structure may be made without a departure from the spirit and scope of the invention. Slight modifications only are necessary to change the engine to one using steam as the motive fluid.

I claim:—

1. In a rotary internal-combustion engine, a cylinder, a rotor in the cylinder, piston wings carried by the rotor and slidable parallel to the axis thereof, the length of the wings being such as to project from the sides of the rotor, explosion and compression chambers in the ends of the cylinder on both sides of the rotor, into which chambers the wings extend when passing the same, abutments located between said chambers, the abutments between the outlet end of the compression chambers and the inlet end of the explosion chambers having channels establishing communication between said chambers, the compression chambers having fuel inlet ports and the explosion chambers having exhaust ports, and rotary valves movable with the rotor, the ends of the cylinder having cavities in which the valves seat, and said cavities having fuel admission ports, the valves having peripheral grooves positioned to lap the admission and the inlet ports, and also provided with peripheral grooves to lap the aforesaid channels.

2. In a rotary internal-combustion engine, a cylinder, a rotor in the cylinder, piston wings carried by the rotor and slidable parallel to the axis thereof, the length of the wings being such as to project from the sides of the rotor, explosion and compression chambers in the ends of the cylinder on both sides of the rotor, into which chambers the wings extend when passing the same, abutments located between said chambers, the abutments between the outlet end of the compression chambers and the inlet end of the explosion chambers having channels and ducts leading from the channels for establishing communication between said chambers, the compression chambers having fuel inlet ports, and the explosion chambers having exhaust ports, and rotary valves movable with the rotor, the ends of the cylinder having cavities in which the valves seat, and into which the aforesaid ducts open, and said cavities having fuel admission ports, the valves having peripheral grooves positioned to lap the admission and the inlet ports, and also provided with peripheral grooves to lap the aforesaid ducts.

3. In a rotary internal-combustion engine, a cylinder, a rotor in the cylinder, piston wings carried by the rotor and slidable parallel to the axis thereof, the length of the wings being such as to project from the sides of the rotor, alternate ones of said wings being compression and working pistons, compression and explosion chambers in the ends of the cylinder on both sides of the rotor, into which chambers the pistons extend when passing the same, two adjacent ones of the chambers on opposite sides of the rotor being the explosion chambers, and the other adjacent ones of the chambers on opposite sides of the rotor being the compression chambers, means for admitting fuel charges to the compression chambers, means for transferring the compressed charges to the explosion chambers, a sinuous cam on the cylinder wall, and means on the piston wings engageable with said cam for effecting the sliding movement of the wings.

4. In a rotary internal-combustion engine, a cylinder, a rotor in the cylinder, piston wings carried by the rotor and slidable parallel to the axis thereof, the length of the wings being such as to project from the sides of the rotor, explosion and compression chambers in the ends of the cylinder on both sides of the rotor, into which chambers the wings extend when passing the same, the compression chambers having inlet ports and ports leading to the explosion chambers, and the explosion chambers having exhaust ports, rotary valves movable with the rotor and controlling the inlet ports and the ports leading to the explosion chambers, a sinuous cam on the cylinder wall, and means on the piston wings engageable with said cam for effecting the sliding movement of the wings.

5. In a rotary internal-combustion engine, a cylinder, a rotor in the cylinder, piston wings carried by the rotor and slidable parallel to the axis thereof, the length of the wings being such as to project from the sides of the rotor, alternate ones of said wings being compression and working pistons, compression and explosion chambers in the ends of the cylinder on both sides of the rotor, into which chambers the pistons extend when passing the same, two adjacent ones of the chambers on opposite sides of the rotor being the explosion chambers, and the other adjacent ones of the chambers on opposite sides of the rotor being the compression chambers, abutments located between the explosion and the compression chambers, the abutments between the outlet end of the compression chambers and the inlet end of the explosion chambers having channels establishing communication between said chambers, the compression chambers having fuel inlet ports and the explosion chambers having exhaust ports, and rotary valves movable with the rotor, the ends of the cylinder having cavities in which the valves seat, and said cavities having fuel admission ports, the valves having peripheral grooves positioned to lap the admission and the inlet ports, and also provided with peripheral grooves to lap the aforesaid channels.

6. In a rotary internal-combustion engine, a cylinder, a rotor in the cylinder, piston wings carried by the rotor and slidable parallel to the axis thereof, the length of the wings being such as to project from the sides of the rotor, alternate ones of said wings being compression and working pistons, compression and explosion chambers in the ends of the cylinder on both sides of the rotor, into which chambers the pistons extend when passing the same, two adjacent ones of the chambers on opposite sides of the rotor being the explosion chambers, and the other adjacent ones of the chambers on opposite sides of the rotor being the compression chambers, abutments located between the compression and explosion chambers, the abutments between the outlet end of the compression chambers and the inlet end of the explosion chambers having channels and ducts leading from the channels for establishing communication between said chambers, the compression chambers having fuel inlet ports, and the explosion chambers having exhaust ports, and rotary valves movable with the rotor, the ends of the cylinder having cavities in which the valves seat and into which the aforesaid ducts open, and said cavities having fuel admission ports, the valves having peripheral grooves positioned to lap the admission and the inlet ports, and also provided with peripheral grooves to lap the aforesaid ducts.

7. In a rotary internal-combustion engine, a cylinder, a rotor in the cylinder, piston wings carried by the rotor and slidable parallel to the axis thereof, the length of the wings being such as to project from the sides of the rotor, explosion and compression chambers in the ends of the cylinder on both sides of the rotor, into which chambers the wings extend when passing the same, the compression chambers having inlet ports and ports leading to the explosion chambers, and the explosion chambers having exhaust ports, rotary valves movable with the rotor and controlling the inlet ports and the ports leading to the explosion chambers, ignition devices, and timers for the ignition devices carried by the valves.

8. A rotary explosion engine including a cylinder having in each of its heads compression and explosion chambers provided with suitable ports and separated by abutments, the set of chambers in each head being angularly displaced with respect to the set of chambers in the other head to bring the explosion and compression chambers in both cylinder heads into succession; a rotor within the cylinder operating between said abutments; alternated working and compression pistons carried by and reciprocable longitudinally of the rotor, each piston projecting within said chambers on both sides of the rotor to constitute moving partitions therein; and rotary valves at the ends of the rotor and operating within the cylinder heads for governing the aforesaid ports.

9. A rotary explosion engine including a cylinder having in each of its heads compression and explosion chambers provided with suitable ports and separated by abutments, these abutments having normally disconnected channels taking part in establishing communication between the chambers separated thereby, the set of chambers in each head being angularly displaced with respect to the set of chambers in the other head to bring the explosion and compression chambers in both cylinder heads into succession; a rotor within the cylinder operating between said abutments; alternated working and compression pistons carried by and reciprocable longitudinally of the rotor, each piston projecting within said chambers on both sides of the rotor to constitute moving partitions therein; and rotary valves at the ends of the rotor and operating within the cylinder heads for connecting the channels in the abutments and controlling the aforesaid ports.

10. A rotary explosion engine including a cylinder having in each of its heads compression and explosion chambers provided with suitable ports and separated by abutments, these abutments having normally disconnected channels taking part in establishing communication between the chambers separated thereby; a rotor within the cylinder operating between said abutments; pistons carried by and reciprocating longitudinally of the rotor and projecting within said chambers to constitute moving partitions therein; and rotary valves at the ends of the rotor and operating within the cylinder heads for connecting the channels in the abutments and controlling the aforesaid ports.

11. A rotary explosion engine including a cylinder having in each of its heads compression and explosion chambers provided with suitable ports and separated by abutments; a rotor within the cylinder operating between said abutments; pistons carried by and reciprocable longitudinally of the rotor, each piston projecting within said chambers on both sides of the rotor to constitute moving partitions therein; and rotary valves at the ends of the rotor and operating within the cylinder heads for governing the aforesaid ports.

12. A rotary explosion engine including a cylinder having in each of its heads compression and explosion chambers provided with suitable ports and separated by abutments; a rotor within the cylinder operating between said abutments; pistons carried by and reciprocable longitudinally of the rotor, each piston projecting within said chambers on both sides of the rotor to constitute moving partitions therein; and rotary valves at the ends of the rotor governing the aforesaid ports.

13. A rotary explosion engine including a cylinder having compression and explosion chambers provided with suitable ports and separated by abutments; a rotor within the cylinder; alternated working and compression pistons carried by and reciprocable longitudinally of the rotor, each piston projecting within said chambers to constitute moving partitions therein; and rotary valve mechanism governing the aforesaid ports.

14. A rotary explosion engine including a cylinder having compression and explosion chambers provided with suitable ports and separated by abutments; a rotor within the cylinder; pistons carried by and reciprocable longitudinally of the rotor, each piston projecting within said chambers to constitute moving partitions therein; and rotary valve mechanism for governing the aforesaid ports.

15. A rotary engine having reciprocable pistons in the ends of which are groups of packing blades that are formed in sections by being split longitudinally of the pistons at different places; means for urging the blades outward in the direction of the length of the pistons; and means for spreading the sections of the blades laterally.

16. A rotary engine having reciprocable pistons in the ends of which are groups of packing blades slotted at their inner ends, the slots being tapered in the direction of the outer ends of the blades; and springs seating in the slots and tending to urge the blades outward in the direction of the length of the pistons, said packing blades being formed in sections by being obliquely split longitudinally of the pistons.

In testimony whereof I affix my signature.

EMIL G. JOHANSON.